(12) United States Patent
Takahashi

(10) Patent No.: US 11,283,952 B2
(45) Date of Patent: Mar. 22, 2022

(54) IMAGE READING APPARATUS

(71) Applicant: KYOCERA Document Solutions Inc., Osaka (JP)

(72) Inventor: Masayoshi Takahashi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/185,024

(22) Filed: Feb. 25, 2021

(65) Prior Publication Data

US 2021/0274058 A1 Sep. 2, 2021

(30) Foreign Application Priority Data

Feb. 27, 2020 (JP) .............................. JP2020-031231

(51) Int. Cl.
*H04N 1/04* (2006.01)
*H04N 1/00* (2006.01)

(52) U.S. Cl.
CPC ..... *H04N 1/00708* (2013.01); *H04N 1/00724* (2013.01); *H04N 1/00734* (2013.01); *H04N 1/00755* (2013.01)

(58) Field of Classification Search
CPC ........... H04N 1/00708; H04N 1/00724; H04N 1/00734; H04N 1/0075; H04N 1/00755
See application file for complete search history.

(56) References Cited

U.S. PATENT DOCUMENTS

2009/0237751 A1* 9/2009 Ishido ................ H04N 1/00681
358/483
2010/0067065 A1* 3/2010 Ishido ................ H04N 1/00737
358/449

FOREIGN PATENT DOCUMENTS

JP 2017-034392 2/2017

* cited by examiner

*Primary Examiner* — Moustapha Diaby
(74) *Attorney, Agent, or Firm* — Lex IP Meister, PLLC

(57) ABSTRACT

An image reading apparatus according to the present disclosure includes: a platen glass on which a document is placed; a light source, an image sensor; an image reading unit for optically reading an image of a reading area of the image sensor; a rotatable document cover for covering the platen glass; a cover state detection unit for the document cover; a control unit to detect a sensor output level of the image sensor; and a document size specification unit for the document. The control unit causes the image reading unit to perform a reading operation for specifying the size of the document in the main scanning direction in a state in which the document cover is open, and causes the light source to emit a predetermined light amount in the reading operation, which is larger than the light amount when the document image is read from the document.

4 Claims, 6 Drawing Sheets

IMAGE READING APPARATUS

INCORPORATION BY REFERENCE

This application is based upon and claims the benefit of priority from the corresponding Japanese Patent Application No. 2020-031231 filed on Feb. 27, 2020, the entire contents of which are incorporated herein by reference.

BACKGROUND

The present disclosure relates to an image reading apparatus.

An image reading apparatus reads an image of a document placed on a document table by irradiating light with a light source and detecting the reflected light with a sensor, and detects an edge of the document based on a difference in luminance distribution of the reflected light when the light source is on and off.

SUMMARY

The image reading apparatus according to the present disclosure includes a platen glass on which a document is placed, a light source, and an image sensor. The image reading apparatus includes: an image reading unit which emits light toward the platen glass by the light source and optically reads an image of a reading area of the image sensor based on the light detected by the image sensor; a document cover which is rotatable to cover the platen glass; a cover state detection unit which detects an open/close state of the document cover; a control unit which controls the light source and detects a sensor output level of the image sensor; and a document size specification unit which specifies a size of the document in a main scanning direction based on the sensor output level. The control unit causes the image reading unit to perform a reading operation for specifying the size of the document in the main scanning direction in a state where the document cover is open based on the open/close state, and causes the light source to a predetermined light amount larger than the light amount when reading the document image from the document, in the reading operation.

DETAILED DESCRIPTION

Embodiments of the present disclosure will be described below with reference to the drawings.

Figure 1:
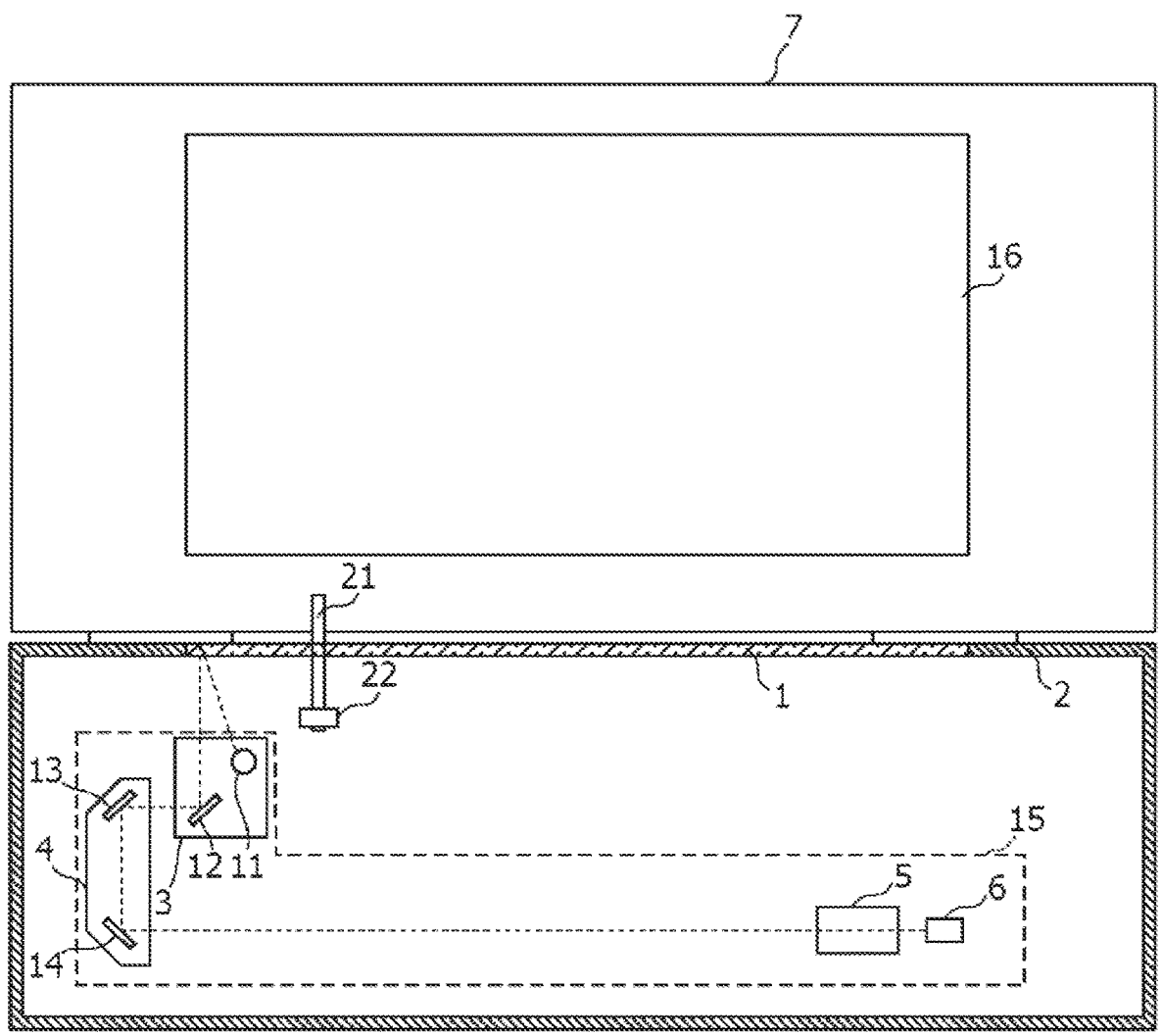
FIG. 1 is a front view showing an internal configuration of an image reading apparatus according to an embodiment of the present disclosure.
Figure 2:
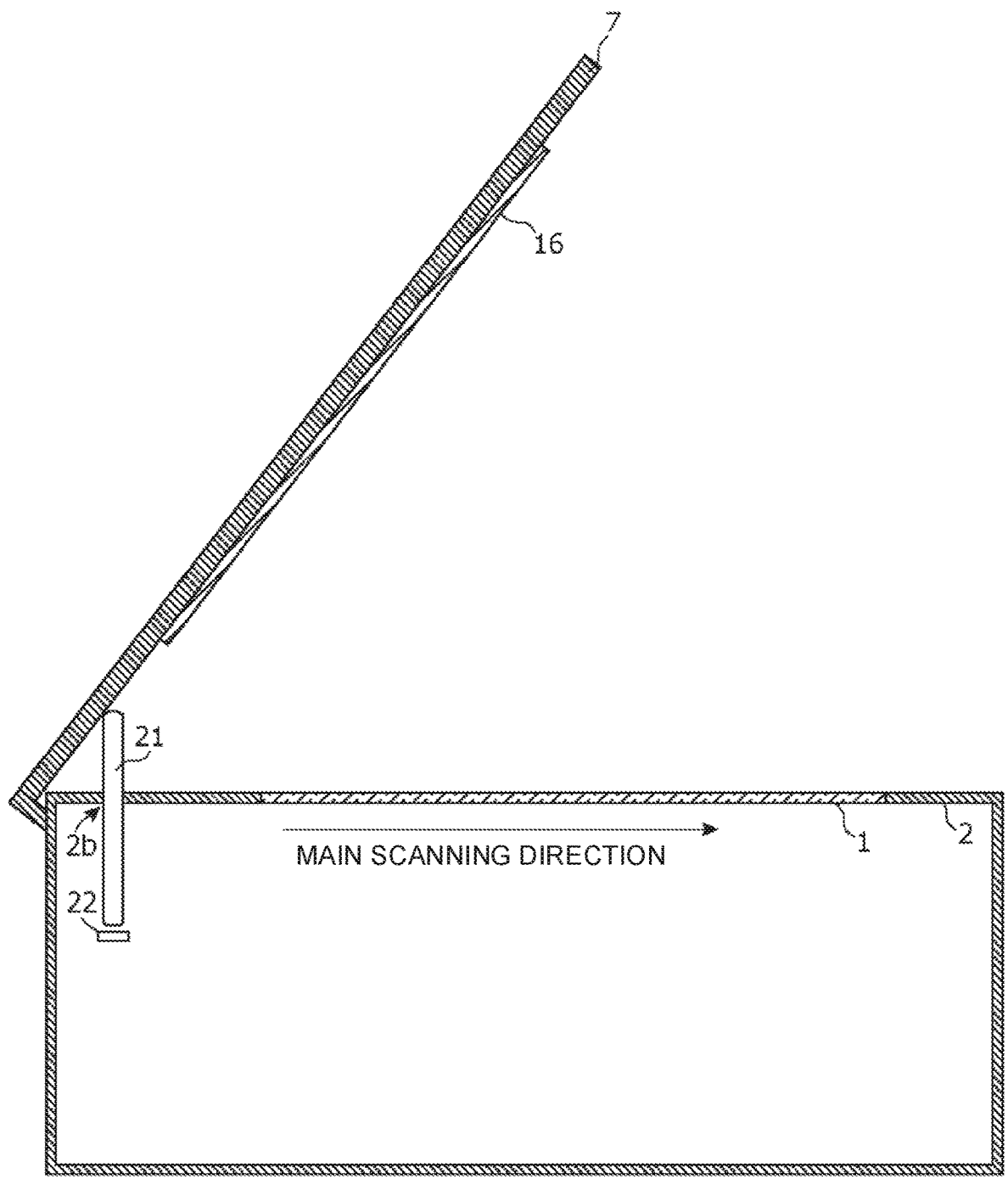
FIG. 2 is a side view showing an internal configuration of an image reading apparatus according to an embodiment of the present disclosure.

FIG. 1 is a front view showing an internal configuration of an image reading apparatus according to an embodiment of the present disclosure. FIG. 2 is a side view showing an internal configuration of an image reading apparatus according to an embodiment of the present disclosure. The image reading apparatus shown in FIGS. 1 and 2 is an apparatus such as a scanner, a copying machine, a digital multifunction device, or the like.

In FIGS. 1 and 2, the platen glass 1 is a transparent document table which is disposed on the upper surface of the housing 2 of the image reading apparatus and on which a document is placed during image reading.

The carriage 3 is provided movably in the sub-scanning direction by a drive source (not shown). The carriage 3 has a lamp 11 and a mirror 12. The lamp 11 is a light source arranged along the main scanning direction and emits light by a plurality of arranged light emitting diodes, for example. The light emitted from the lamp 11 is reflected by a document placed on the platen glass 1 and a document holder 16 of a document cover 7 to be described later in accordance with the position of the carriage 3. The mirror 12 reflects light, such as reflected light from a document, incident through the platen glass 1. The carriage 4 is provided movably together with the carriage 3 in the sub-scanning direction by a drive source (not shown). The carriage 4 is provided with mirrors 13, 14, and the mirrors 13, 14 reflect light from the mirror 12 of the carriage 3 twice and emit it along the sub-scanning direction.

The imaging lens 5 images the light from the mirror 14 on the image sensor 6. The image sensor 6 is an image sensor having light receiving elements of a predetermined number of pixels arranged in the main scanning direction, and outputs an electric signal corresponding to the amount of light received for the pixels of the predetermined number for each line. As the image sensor 6, for example, a CCD (Charge Coupled Device) is used. That is, the lamp 11 irradiates the reading position with light, and the image sensor 6 detects the reflected light from the reading position as an image.

The image reading unit 15 includes carriages 3 and 4, an imaging lens 5, an image sensor 6, a lamp 11, a mirror 12, mirrors 13 and 14, and the like. The image reading unit 15 emits light toward the platen glass 1 by the lamp 11, and optically reads an image in the reading area of the image sensor 6 (scanned image) based on the light detected by the image sensor 6 (based on the optics in image reader 15). The read image includes not only an image of a document placed on the platen glass 1 but also an image in a range where there is no document (image by reflected light from the document holder 16 of the document cover 7 or disturbance light incident through the platen glass 1).

As shown in FIG. 1 and FIG. 2, the document cover 7 is an openable and closable substantially flat plate member which is rotatably installed with a rotary end on the back side as an axis. The document cover 7 is provided with a white document holder 16 for holding the document placed on the platen glass 1. The document cover 7 brings the document into close contact with the platen glass 1, covers the platen glass, and suppresses incident of disturbance light (environmental light) from the platen glass 1 to the inside of the apparatus when reading an image.

Further, the image reading apparatus includes, as an opening/closing sensor of the document cover 7, a movable member 21 and an optical sensor 22. The movable member 21 is, for example, a rod-shaped member, which is disposed in the hole 2b of the housing 2, is in contact with the document cover 7 by being urged by a spring (not shown), and moves in a direction substantially perpendicular to the platen glass 1 in conjunction with the opening and closing of the document cover 7. The optical sensor 22 detects that the movable member 21 has moved beyond a predetermined position. For example, optical sensor 22 is a PI (Photo Interruption) sensor.

Figure 3:
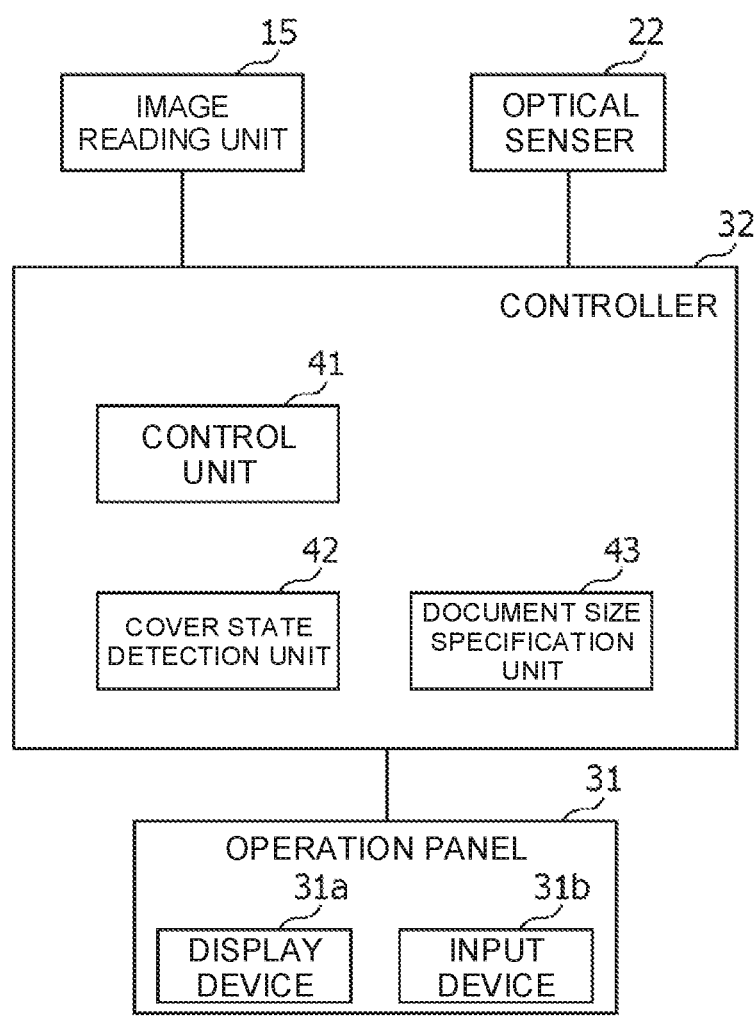
FIG. 3 is a block diagram showing an electrical configuration of the image reading apparatus shown in FIGS. 1 and 2.
Figure 4:
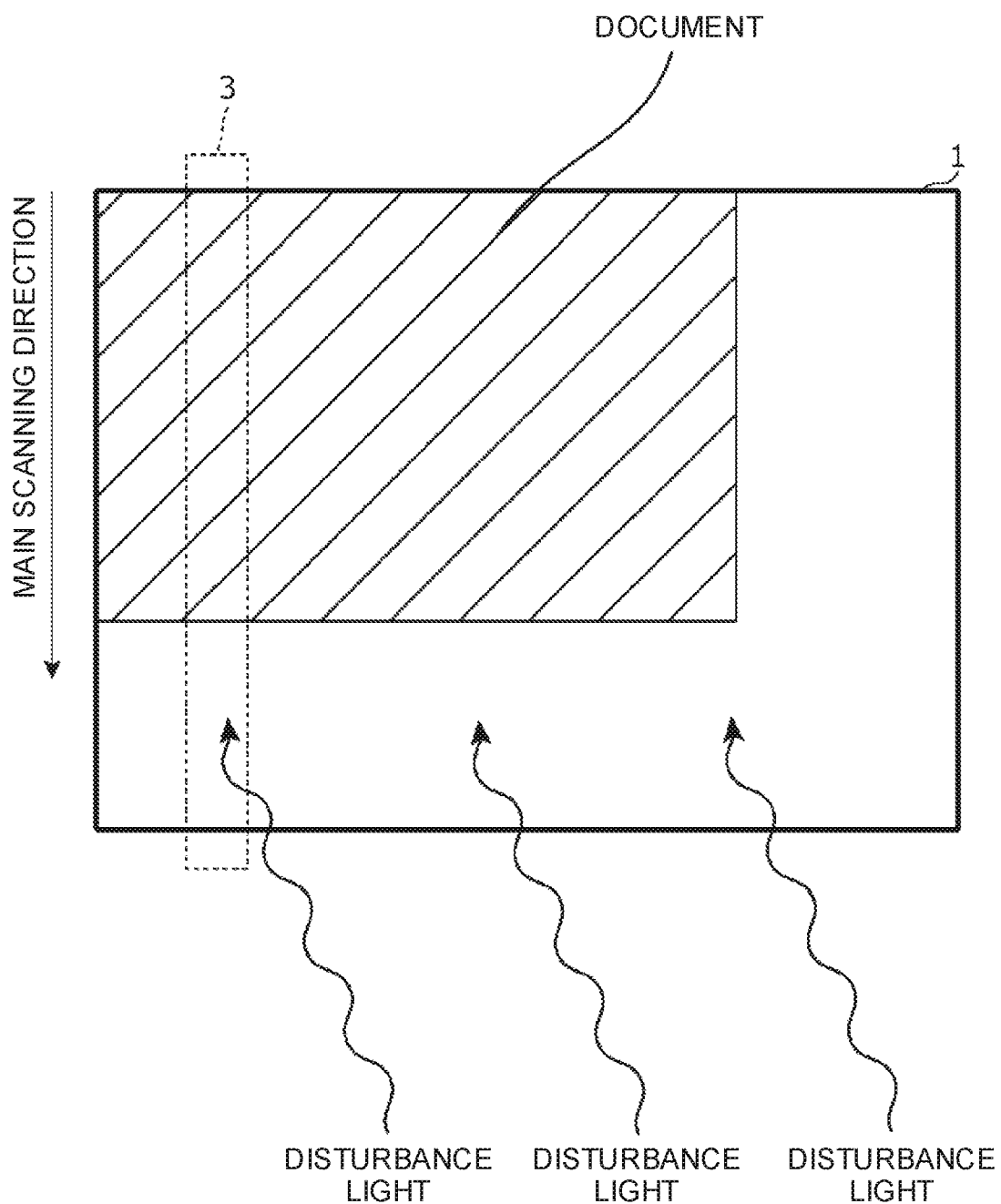
FIG. 4 is a diagram showing an example of a document placed on the platen glass 1 in the image reading apparatus shown in FIGS. 1 and 2.

FIG. 3 is a block diagram showing an electrical configuration of the image reading apparatus shown in FIGS. 1 and 2. FIG. 4 is a diagram showing an example of a document placed on the platen glass 1 in the image reading apparatus shown in FIGS. 1 and 2.

As shown in FIG. 3, the image reading apparatus shown in FIGS. 1 and 2 further includes an operation panel 31 and a controller 32.

The operation panel 31 is disposed on the surface of the housing 2, and is provided with a display device 31a, such as a liquid crystal display, for displaying various information to the user, and an input device 31b, such as a key for detecting user operation and a touch panel.

The controller 32 controls an internal device such as the image reading unit 15 and executes data processing such as image processing. The controller 32 includes, for example, an ASIC (Application Specific Integrated Circuit) and a computer operating in accordance with a control program, and operates as various processing units using the ASIC and the computer. Here, the controller 32 operates as a control unit 41, a cover state detection unit 42, and a document size specification unit 43.

The control unit 41 controls the image reading unit 15 in accordance with a user operation or the like to read an image of a document (scan jobs, copy jobs, etc.). At this time, the control unit 41 controls the lamp 11 of the image reading unit 15 to detect the sensor output level of the image sensor 6. The control unit 41 uses the cover state detection unit 42 to detect the open/close state of the document cover 7, uses the document size specification unit 43 to specify the size of the document in the main scanning direction, and, based on the size, extracts the document image (image having a width corresponding to the width of the document in the main scanning direction, for example, as shown in FIG. 4) from the read image (image having a width corresponding to the width of the platen glass 1 in the main scanning direction, for example, as shown in FIG. 4) obtained by the image reading unit 15. The control unit 41 prints the extracted document image by a printing device (not shown), generates a file of the extracted document image, transmits the file by a communication device (not shown), or stores the file in a storage device (not shown).

A cover state detection unit 42 detects the open/close state of the document cover 7 based on the sensor output level of the optical sensor 22. Specifically, the cover state detection unit 42 detects that the document cover 7 starts to be closed from the fully opened state by a change in the sensor output level of the optical sensor 22. It should be noted that a sensor similar to the optical sensor 22 may be added at a predetermined position in the movable range of the movable member 21, and the cover state detection unit 42 detects the closed state (the state in which the document holder 16 of the document cover 7 is in contact with the platen glass 1 or the document) of the document cover based on the sensor output level of the sensor.

The document size specification unit 43 specifies the size of the document placed on the platen glass 1 in the main scanning direction based on the sensor output level of the image sensor 6 obtained by the reading operation performed by the image reading unit 15 under the specific conditions by being controlled by the control unit 41.

The control unit 41 causes the image reading unit 15 to perform a reading operation for specifying the size of the document in the main scanning direction in a state in which the document cover 7 is open (that is, a state in which the document cover 7 is not completely closed) on the basis of the above-described open/close state, and causes the lamp 11 to emit an amount of light larger than the amount of light when reading the document image in the reading operation.

That is when specifying the size of the document in the main scanning direction, the control unit 41 causes the image reading unit 15 to perform a reading operation under a specific condition different from that when the document image is read (when image data of the document image is generated). Specifically, when specifying the size of the document in the main scanning direction, the control unit 41 causes the lamp 11 to emit a predetermined amount of light (hereinafter referred to as "measuring light amount") larger than the amount of light (for example, twice the amount of light) when reading the document image.

Further, in this embodiment, when specifying the size of the document in the main scanning direction, the control unit 41 (a) causes the lamp 11 to emit the measuring light amount described above, and (b) makes the sensitivity of the image sensor 6 lower than when reading the document image.

For example, the sensitivity of the image sensor 6 may be set low at a decreasing rate which is the inverse of the increasing rate of the light amount of the lamp 11.

For example, when specifying the size of the document in the main scanning direction, the control unit 41 electrically controls the conduction current of the lamp 11 to increase the light amount of the lamp 11. Alternatively, when the lamp 11 is a three-color light source having three light sources corresponding to three primary colors (RGB) and when the three light sources are sequentially emitted one by one when reading a document image, the control unit 41 may increase the above-mentioned light amount by simultaneously emitting two or three of the three light sources when specifying the size of the document in the main scanning direction.

For example, when specifying the size of the document in the main scanning direction, the control unit 41 sets the light receiving time for one line of the image sensor 6 (that is, the light receiving time for generating the image signal for one line) to be shorter than the light receiving time when reading the document image, thereby lowering the sensitivity of the image sensor 6 as described above. For example, the light receiving time of the image sensor 6 is shortened by increasing the driving clock frequency of the image sensor 6.

Further, for example, when specifying the size of the document in the main scanning direction, the control unit 41 may lower the reading resolution than when reading the document image to lower the sensitivity.

When specifying the size of the document in the main scanning direction, the control unit 41 may cause the lamp 11 to emit the above-described measuring light amount intermittently at a predetermined line ratio (for example, in a reading operation for one line in a reading period for a predetermined plurality of lines). Thus, an increase in power consumption and an increase in heat generation due to an increase in light amount are suppressed. Further, the glare felt by the user by the light emitted outside through the platen glass 1 is suppressed.

Next, the operation of the image reading apparatus will be described.

When the cover state detection unit 42 detects that the document cover 7 has started to be closed, the control unit 41 executes a process for specifying the document size as follows.

Further, the control unit 41 controls the image reading unit 15 so that the reading position of the image reading unit 15 is at a predetermined position (that is, a position within the range of the platen glass 1 in the sub-scanning direction, where the document is highly likely to exist) in the sub-scanning direction, and at that reading position, the lamp 11 is turned on with the above-described measuring light amount, and the line image is read by the image sensor 6 with the above-described low sensitivity to generate an image signal (that is, a signal having a sensor output level at each pixel position), and acquires the image signal.

Further, the control unit 41 turns off the lamp 11 at that reading position, causes the image sensor 6 to read the line image at low sensitivity to generate an image signal, and acquires the image signal.

A document size specification unit 43 derives a difference in the level of the image signal at each pixel position (pixel position in the main scanning direction) on the basis of the obtained two image signals, compares the value of the difference with a predetermined threshold value, specifies a range in which the value of the difference is higher than the predetermined threshold value as a range corresponding to the document in the read image, and specifies the width of the range as the document size.

Figure 5:
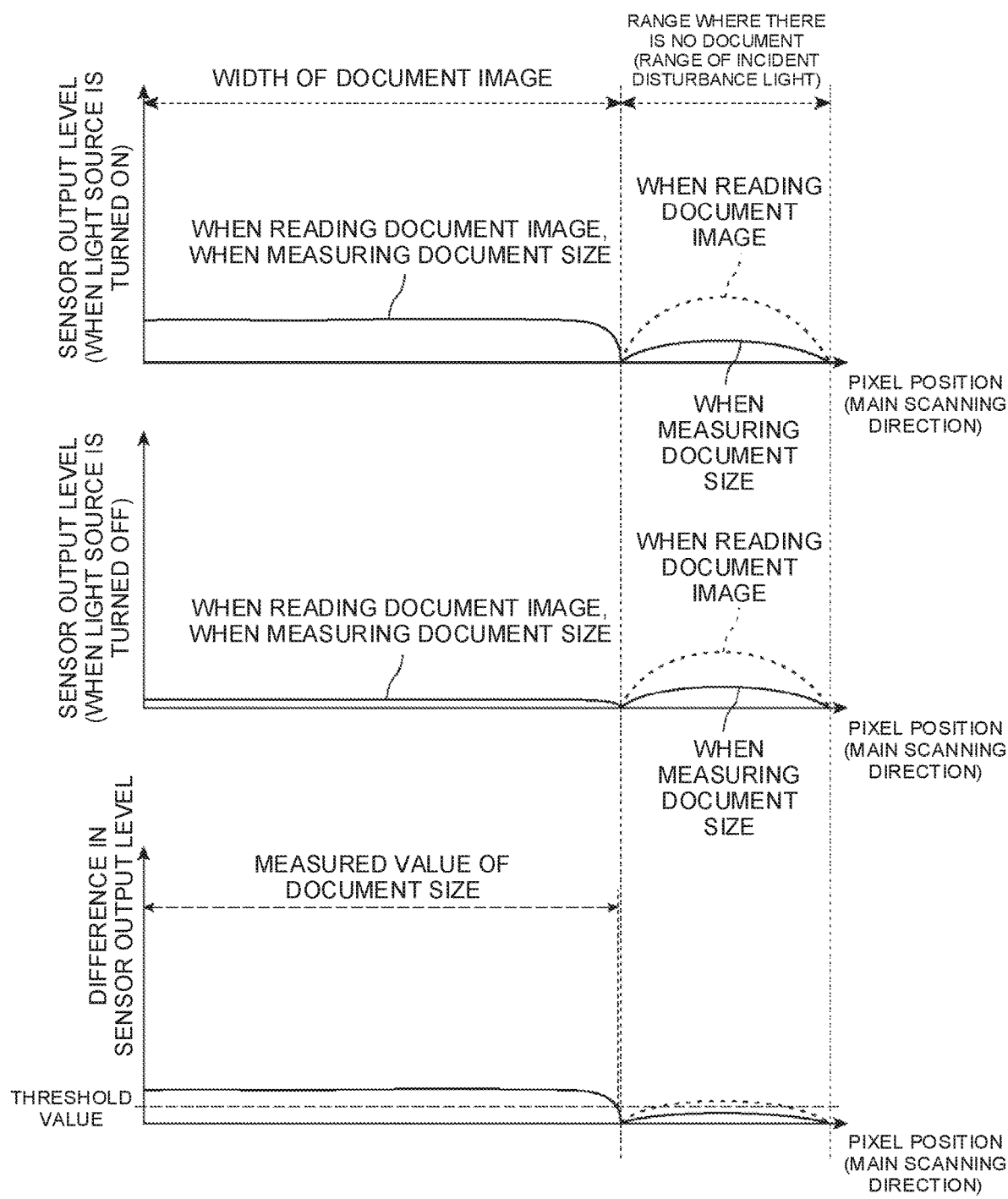
FIG. 5 is a diagram for explaining specification of a document size (width of the document) of a document of relatively high density in the image reading apparatus shown in FIGS. 1 and 2.
Figure 6:
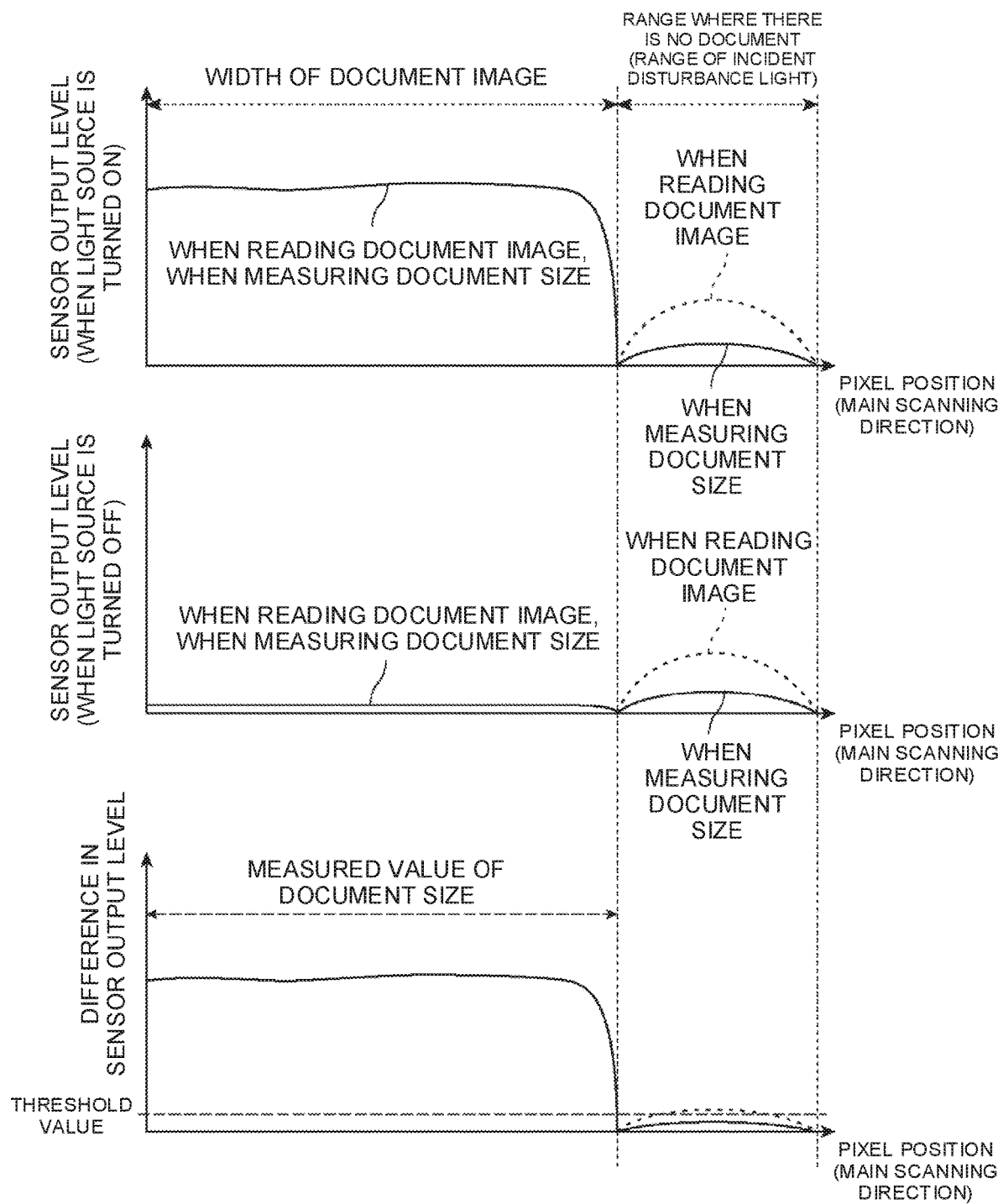
FIG. 6 is a diagram for explaining specification of a document size (width of the document) of a document of relatively low density in the image reading apparatus shown in FIGS. 1 and 2.

FIG. 5 is a diagram for explaining specification of a document size (width of the document) of a document of relatively high density in the image reading apparatus shown in FIGS. 1 and 2. FIG. 6 is a diagram for explaining specification of a document size (width of the document) of a document of relatively low density in the image reading apparatus shown in FIGS. 1 and 2.

As described above, in the image reading apparatus, since the measuring light amount (regardless of the document density) is set high or the sensitivity of the image sensor 6 is set low, a sufficient sensor output level can be obtained in the document range when the light source is turned on, and the sensor output level caused by the disturbance light is lowered in the range without the document, for example, as shown in FIG. 5, even in the case of the document including a relatively high density region. In the range where there is no document, the disturbance light is incident regardless of whether the light source is turned on or off, and the same sensor output level as when the light source is turned on can be obtained even when the light source is turned off. Since the sensitivity of the image sensor 6 is set low, the sensor output level is lowered regardless of whether the light source is turned on or off in the range where there is no document. Therefore, the difference between the sensor output level when the light source is turned on and the sensor output level when the light source is turned off is also reduced. Therefore, the difference between the sensor output level when the light source is turned on and the sensor output level when the light source is turned off in the document range is relatively large as compared with the difference between the sensor output level when the light source is turned on and the sensor output level when the light source is turned off in the range without the document, and the range (and therefore the size of the document) corresponding to the document in the read image is accurately specified by the above-described threshold value.

In the case of a document having a relatively low density, for example as shown in FIG. 6, an image signal having a high sensor output level is obtained when the light source is turned on. Therefore, the difference between the sensor output level when the light source is turned on and the sensor output level when the light source is turned off in the document range becomes sufficiently large. On the other hand, in the range where there is no document, the disturbance light is incident regardless of whether the light source is turned on or off, and the same sensor output level as the light source is turned on can be obtained even when the light source is turned off, and the difference between the sensor output level when the light source is turned on and that when the light source is turned off is sufficiently small. Therefore, the range corresponding to the document in the read image is accurately specified by the above-described threshold value (same threshold value regardless of document density).

Thereafter, the document cover 7 is closed, and the control unit 41 changes the light amount of the lamp 11 and the image sensor 6 to reference values for image reading, and then controls the image reading unit 15 so that the image reading unit 15 reads the document image. Then, the control unit 41 acquires the read image obtained by the read operation for the document image, from the image reading unit 15, and extracts the document image from the read image with the specified document size.

As described above, according to the embodiment, the image reading unit 15 includes the lamp 11 and the image sensor 6, and emits light toward the platen glass 1 by the lamp 11, and optically reads an image in the reading area of the image sensor 6 based on the light detected by the image sensor 6. Based on the open/close state of the document cover 7 detected by the cover state detection unit 42, the control unit 41 causes the image reading unit 15 to perform a reading operation for specifying the size of the document in the main scanning direction in a state in which the document cover 7 is open, and causes the lamp 11 to emit a predetermined amount of light larger than the amount of light when reading the document image in the reading operation.

Thus, since the sensor output level of the document range is relatively higher than the sensor output level of the range without the document, the document size is accurately specified regardless of the density of the document.

Various changes and modifications to the above-described embodiments will be apparent to those skilled in the art. Such changes and modifications may be made without departing from the spirit and scope of the subject matter and without diminishing the intended advantages. That is, such changes and modifications are intended to be included in the claims.

For example, in the above-described embodiment, the image reading unit 15 may use a CIS (Contact Image Sensor) instead of the above-described configuration.

In the above embodiment, when the range of the document image in the read image can be distinguished as described above, without lowering the sensitivity of the image sensor 6, the sensitivity of the image sensor 6 may be made the same as the sensitivity at the time of image reading without lowering the sensitivity.

What is claimed is:

1. An image reading apparatus comprising:
a platen glass on which a document is placed;
an image reading unit which is provided with a light source and an image sensor, the image reading unit emitting light toward the platen glass by the light source and optically reading an image of a reading area of the image sensor based on the light detected by the image sensor;

a rotatable document cover for covering the platen glass;
a cover state detection unit for detecting an open/close state of the document cover;
a control unit for controlling the light source to detect a sensor output level of the image sensor; and
a document size specification unit for specifying a size of the document in a main scanning direction based on the sensor output level,
wherein the control unit causes the image reading unit to perform a reading operation for specifying the size of the document in the main scanning direction in a state in which the document cover is open, based on the open/close state, and causes the light source to emit a predetermined light amount in the reading operation, which is larger than a light amount when the document image is read from the document, and
wherein when specifying the size of the document in the main scanning direction, the control unit
(a) causes the light source to emit the predetermined light amount which is larger than the light amount when the document image is read, and
(b) causes a sensitivity of the image sensor to be lower than when reading the document image.

2. The image reading apparatus according to claim 1, wherein when specifying the size of the document in the main scanning direction, the control unit sets a light receiving time for one line of the image sensor to be shorter than a light receiving time when reading the document image, thereby lowering the sensitivity of the image sensor.

3. An image reading apparatus comprising:
a platen glass on which a document is placed;
an image reading unit which is provided with a light source and an image sensor, the image reading unit emitting light toward the platen glass by the light source and optically reading an image of a reading area of the image sensor based on the light detected by the image sensor;
a rotatable document cover for covering the platen glass;
a cover state detection unit for detecting an open/close state of the document cover;
a control unit for controlling the light source to detect a sensor output level of the image sensor; and
a document size specification unit for specifying a size of the document in a main scanning direction based on the sensor output level,
wherein the control unit causes the image reading unit to perform a reading operation for specifying the size of the document in the main scanning direction in a state in which the document cover is open, based on the open/close state, and causes the light source to emit a predetermined light amount in the reading operation, which is larger than a light amount when the document image is read from the document, and
wherein the light source is a three-color light source having three light sources corresponding to three primary colors, and the control unit
(a) causes the three light sources to emit light sequentially one by one when reading the document image, and
(b) causes two or three of the three light sources to emit light simultaneously when specifying the size of the document in the main scanning direction.

4. An image reading apparatus comprising:
a platen glass on which a document is placed;
an image reading unit which is provided with a light source and an image sensor, the image reading unit emitting light toward the platen glass by the light source and optically reading an image of a reading area of the image sensor based on the light detected by the image sensor;
a rotatable document cover for covering the platen glass;
a cover state detection unit for detecting an open/close state of the document cover;
a control unit for controlling the light source to detect a sensor output level of the image sensor; and
a document size specification unit for specifying a size of the document in a main scanning direction based on the sensor output level,
wherein the control unit causes the image reading unit to perform a reading operation for specifying the size of the document in the main scanning direction in a state in which the document cover is open, based on the open/close state, and causes the light source to emit a predetermined light amount in the reading operation, which is larger than a light amount when the document image is read from the document, and
wherein when specifying the size of the document in the main scanning direction, the control unit causes the light source to emit the predetermined light amount intermittently at a predetermined line ratio.

* * * * *